May 2, 1961  R. F. SMART  2,982,250
EQUINE RESTRAINING DEVICE
Filed Aug. 27, 1958

Ray F. Smart
INVENTOR.

BY Clarence A.O'Brien
and Harvey B. Jacobson
Attorneys

United States Patent Office 2,982,250
Patented May 2, 1961

2,982,250

EQUINE RESTRAINING DEVICE

Ray F. Smart, Box 186, Boerne, Tex.

Filed Aug. 27, 1958, Ser. No. 757,474

6 Claims. (Cl. 119—132)

This invention relates to new and useful improvements in restraining devices particularly although not necessarily, for horses and has for its primary object to provide, in a manner as hereinafter set forth, novel means for firmly, but humanely, controlling the animal by the application of whatever pressure may be required to the prehensile portion of the upper lip.

Another very important object of the present invention is to provide a restraining device of the aforementioned character which, on all but the most obstinate or unruly horses, may be expeditiously and safely used by a single individual and which, further when applied, remains in position on the animal, leaving both hands of the operator free to be used for other purposes such, for example, as shoeing operations, giving injections, making various examinations, etc.

Other objects of the invention are to provide an equine restraining device of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
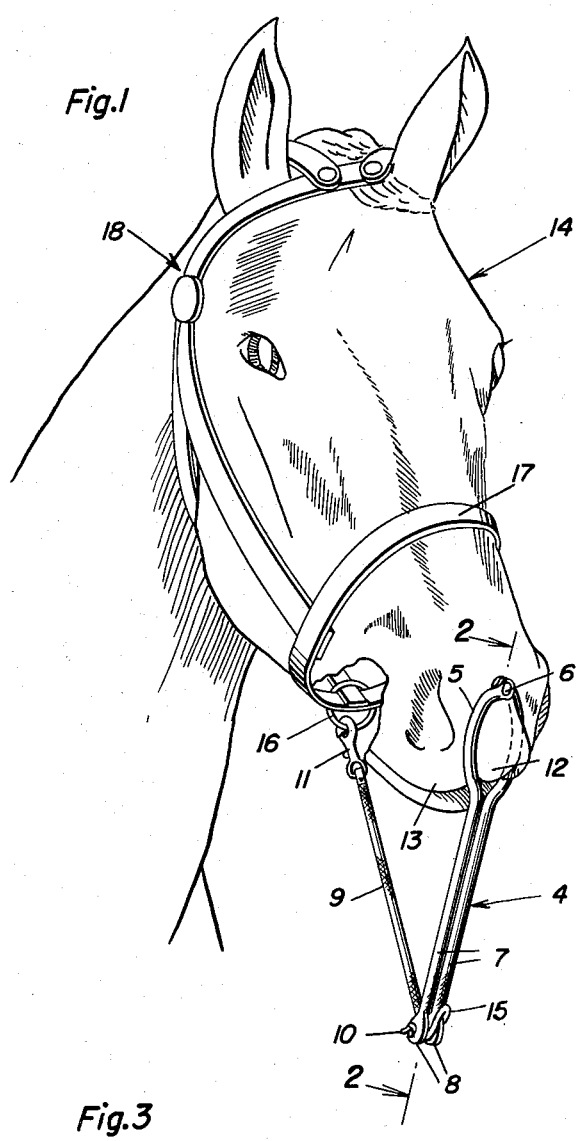
Figure 1 is a perspective view, showing a restraining device embodying the present invention in use.
Figure 2:
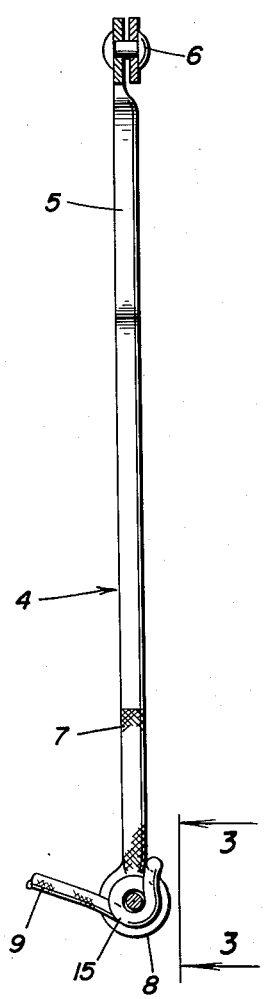
Figure 2 is a vertical sectional view through the device.

Referring now to the drawing in detail, it will be seen that the embodiment of the invention which has been illustrated comprises a pair of levers which are designated generally by reference character 4. The levers 4, which may be of any desired dimensions, are in the form of rods of suitable metal.

The levers 4 are formed to provide a pair of opposed, outwardly bowed, coacting jaws 5 which are pivotally connected at one end, as indicated at 6. Extending from the other or free ends of the jaws 5 is a pair of parallel, milled handles 7. The handles 7 terminate at their free ends in eyes 8.

A rope or the like 9 of suitable material has one end portion threaded through the eyes 8 and anchored by a knot 10. Connected to the other end of the rope 9 is a snap hook 11.

Figure 3:
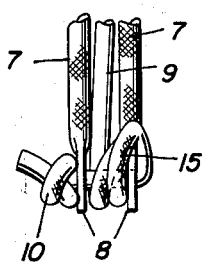
Figure 3 is a view in front elevation of the lower end portion of the device, showing the method of securing the instrument in closed position.

It is thought that the operation or use of the device will be readily apparent from a consideration of the foregoing. Briefly, the device is applied with the handles 7 extending downwardly. The operator swings the handles 7 toward each other for closing the jaws 5 on the prehensile portion 12 of the upper lip 13 of the animal to be restrained or controlled, as indicated at 14. When the desired pressure is thus applied the rope 9 is reversed and wrapped on itself between the eyes 8 as at 15 (see Fig. 3) and the snap hook 11 is engaged with the usual ring 16 at the rear of the usual nose band 17 of a halter 18 on the animal. Thus, the instrument is secured in closed position on the horse. Of course, to remove the device the foregoing procedure is substantially reversed. With the instrument secured in adjusted position on the animal the operator is free to use both hands for other purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An equine restraining device comprising: a pair of levers having upper ends pivotally connected and provided with cooperating gripping jaws adjacent said ends adapted to receive and grip the animal's upper lip therebetween, portions of said levers providing elongated handles and inelastic flexible means on the free ends of said handles selectively securing said levers in closed position.

2. An equine restraining device comprising: a pair of levers having outwardly and longitudinally bowed jaws, the latter having upper ends pivotally connected and adapted to receive and grip the animal's upper lip therebetween, portions of said levers providing elongated handles and means for securing said levers in closed position, said means including a flexible strand having one end portion anchored to one of the levers and adjustably connected to the other of said levers.

3. An equine restraining device comprising: a pair of levers having upper ends pivotally connected at one end and adapted to receive and grip the animal's upper lip therebetween, portions of said levers providing elongated handles, means for securing said levers in closed position, said means including a flexible strand having one end portion anchored to one of the levers and adjustably connected to the other of said levers, and a hook on the other end of the strand for connecting said strand to an anchor.

4. An equine restraining device comprising: a pair of levers said levers being elongated and having upper and lower ends, the upper ends having opposed coplanar longitudinally bowed portions constituting jaws, said upper end being pivotally connected at one end and adapted to receive and grip the animal's upper lip therebetween, elongated portions of the levers below the jaws being straight and depending therefrom and providing readily accessible handles, eyes on the free ends of the handles, a flexible strand having one end portion threaded through the eyes and anchored to one of the levers, and means on the other end of the strand for connecting said strand to an anchor for securing the levers in closed position.

5. An equine restraining device comprising: a pair of levers having upper and lower ends, said levers being elongated, the upper ends thereof being provided with coplanar longitudinally elongated outwardly bowed cooperating portions defining a pair of lip embracing jaws, said jaws being the immediate vicinity of said upper ends and said upper ends being pivotally connected at one end and adapted to receive and grip the animal's upper lip therebetween, the portions of the levers located downwardly of said jaws being straight and providing handles, eyes on the free ends of said handles, a rope having one end portion threaded through the eyes and terminating in a knot for anchoring said rope to one of the levers, said rope being windable on itself between the eyes for securing the levers in closed position, and a snap hook on the other end of the rope for connecting same to a halter on the animal with the levers in closed position.

6. An equine restraining device comprising: a pair of elongated, opposed, outwardly bowed jaws pivotally connected at upper ends thereof and adapted to receive and grip the animal's upper lip therebetween, elongated linearly straight operating handles on lower ends of said jaws, means on lower free ends of the handles for securing the jaws in closed position, said means including alignable eyes, a rope having one end portion threaded through the eyes and anchored to one of the handles, said rope being windable on itself between the eyes for securing the handles in closed position, and a snap hook on the other end of the rope for attaching said rope to a halter on the animal.

References Cited in the file of this patent

UNITED STATES PATENTS

| | | |
|---|---|---|
| 260,748 | Dupee | July 11, 1882 |
| 539,811 | Heaton | May 28, 1895 |
| 598,740 | Noel | Feb. 8, 1898 |
| 1,344,791 | Chester | June 29, 1920 |

FOREIGN PATENTS

| | | |
|---|---|---|
| 256,100 | Italy | Dec. 7, 1927 |
| 614,956 | Great Britain | Dec. 30, 1948 |